Patented June 27, 1933

1,916,034

UNITED STATES PATENT OFFICE

FLORUS BIERLING, OF LEIPZIG, GERMANY

PROCESS OF PRODUCING ARTIFICIAL STONE PLATES

No Drawing. Application filed December 19, 1931, Serial No. 582,185, and in Germany December 29, 1930.

The present invention relates to a process of producing artificial stone plates blocks or slabs and particularly to a process of producing artificial cementitious stone plates having a highly glazed colored layer or facing element.

As is known, artificial stone plates of cementitious composition having a colored glossy or glazed layer and an uncolored filler layer, are usually produced by pouring a colored facing material on a smooth surface or base and thereupon applying the filling mass in the form of a stiff or thick mortar. When pure water is used for wetting the mass to be cast the plates obtained do not possess sufficient density and hardness. Moreover plates of this kind are of porous nature and do not possess any glossiness or glaze. Usually therefore casein or the like is added to the water which is used for wetting the glazed facing layer, but the glossy appearance of stone plates prepared in this way will last only for a short time, since casein is soluble in water.

A further drawback of plates of the above named kind having a highly glazed layer is that the glazed surface is frequently scratched or otherwise damaged during the transport of the plates to the place where they are to be used or while the plates are being laid into a structure. It is often necessary to mend the plates after the same have been laid or built into a structure, but in many cases it will be impossible to repair the damage done. The damage is most frequently caused by carelessness on the part of the mason or tile setter when mounting the plates on a wall or the like by means of concrete and sand.

It is an object of the invention to overcome the above named drawbacks. I have found, that it is possible to produce artificial stone plates having a durable colored highly glazed face by adding hydrochloric acid to the water which is used for wetting the mass from which the glazed face is formed. The effect of this addition is, that the thick mass, after the same is stirred for a short time while heat is generated therein, is converted into a thin fluid which can easily be cast. This fluid will therefore become evenly and smoothly distributed over the surface to which it is applied, so that no pores or the like are formed therein. Another effect of the addition of hydrochloric acid is, that, after the facing layer solidifies, a facing is obtained which is much harder than the facings obtained by the methods heretofore practiced.

The stone plates prepared in accordance with the method described above are not easily damaged, even by rough handling. A still more complete protection for the facing may be obtained by covering the finished high-glaze facing with a water-soluble coating of gelatine, glue or some other suitable substance, which coating, after the plates have been mounted, may be washed away with hot water, whereupon the reflecting high-glaze surface of the plates again becomes visible.

The mass from which the glazed layer is formed is produced in the following manner: Portland cement, very fine stone dust, asbestos dust or carborundum and a cement dye of the desired color are mixed in dry state. The dry mass is thereupon mixed with a wetting fluid consisting of distilled water, a cement densifying agent and 5-10% of hydrochloric acid until a mortar of the desired consistency is obtained. The cement densifying agent may for instance consist of a fluid containing linseed oil, ammonia, tragacanth gum and water. Through the addition of the cement densifying agent the plates are made non-absorbent. The amount of hydrochloric acid added is dependent on the nature and quantity of the materials which are added to the Portland cement. The mass is poured on a smooth surface, for instance on glass. The casting may be performed in known manner. A uni-colored, multi-colored or marbled mass may be produced. If it is desired to produce a marbled mass it will of course be necessary to employ suitable marbling tools, such as marbling funnels and the like. Immediately after the colored layer has been poured upon the smooth surface the filling mass is applied. The filling mass consists of 1 part of Portland cement of high quality, 2-3 parts of sand, asbestos fibers and water. The filling mass has the consistency of thick, stiff mortar. The composite body consisting of the colored facing mass and the filling mass is permitted to rest for about 1-2 days and may thereupon easily be removed from the base on which it was prepared. The finished plate possesses a highly glazed durable reflecting surface.

When the plates have been removed from the base or from the mold the same are allowed to after-harden for some time and the glossy or glazed surface of the same is thereupon covered with a coating of gelatine, glue or other water-soluble substance.

As soon as the plate has received the protective coating it is ready for transport and handling. The coating prevents the plate from being scratched or otherwise damaged during transport and during the mounting procedure. The mounted plate is washed with hot water, whereby the glazed surface is exposed.

The effect of the addition of hydrochloric acid to the facing material is, that the cement binds faster than usual and that, after the casting, a surface is obtained which is free from pores and which is much denser than the surfaces obtained by the usual treatments. The plates produced in accordance with the process described above maintain their glossy look for a very long time.

I claim:—

1. A process of producing cementitious artificial stone plates and blocks consisting of a colored facing element having a glossy surface and a backing element, said process comprising the steps of mixing the substances from which the glossy facing element is to be formed, admixing a wetting fluid containing as an ingredient hydrochloric acid, pouring the resulting facing mass on a smooth surface, applying a cementitious backing mass to said facing mass, allowing the composite body to harden, separating such body from said smooth surface and covering the glossy surface of said body with a water-soluble coating.

2. A process of producing cementitious artificial stone plates and blocks consisting of a colored facing element having a highly-glazed surface and a backing element, said process comprising the steps of mixing cement, stone dust, asbestos dust, and a cement dyeing substance in dry state, mixing the obtained mass with a wetting fluid containing water, cement densifying agents and hydrochloric acid, pouring this composition on a body having a smooth surface adapted to receive the composition, applying a backing mass containing cement, sand, asbestos fibers and water to the facing mass, allowing the composite body to harden, separating such body from said smooth surface and covering the glossy surface of said body with a water-soluble coating.

In testimony whereof I affix my signature.

FLORUS BIERLING.